(12) United States Patent
Shankar (10) Patent No.: US 11,756,049 B1
(45) Date of Patent: Sep. 12, 2023

(54) DETECTION OF EVASIVE ITEM LISTINGS

(71) Applicant: Amazon Technologies, Inc., Seattle, WA (US)

(72) Inventor: Ravi Shankar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 186 days.

(21) Appl. No.: 17/010,513

(22) Filed: Sep. 2, 2020

(51) Int. Cl.
| | |
|---|---|
| *G06Q 30/018* | (2023.01) |
| *G06Q 30/0201* | (2023.01) |
| *G06Q 30/0601* | (2023.01) |
| *G10L 15/183* | (2013.01) |
| *G06N 20/00* | (2019.01) |
| *G06N 5/04* | (2023.01) |
| *G08B 21/18* | (2006.01) |

(52) U.S. Cl.
CPC .......... *G06Q 30/0185* (2013.01); *G06N 5/04* (2013.01); *G06N 20/00* (2019.01); *G06Q 30/0201* (2013.01); *G06Q 30/0206* (2013.01); *G06Q 30/0609* (2013.01); *G08B 21/182* (2013.01); *G10L 15/183* (2013.01)

(58) Field of Classification Search
None
See application file for complete search history.

(56) References Cited

U.S. PATENT DOCUMENTS

| | | | | |
|---|---|---|---|---|
| 10,885,561 | B2 * | 1/2021 | Psota | G06Q 30/0241 |
| 11,308,497 | B2 * | 4/2022 | Dong | G06N 5/02 |
| 2011/0078487 | A1 * | 3/2011 | Nielsen | G06Q 30/0251 |
| | | | | 707/E17.108 |
| 2017/0357896 | A1 * | 12/2017 | Tsatsin | G06N 3/084 |
| 2019/0065986 | A1 * | 2/2019 | Witbrock | G06N 7/01 |
| 2019/0266234 | A1 * | 8/2019 | Ormerod | G06F 40/232 |
| 2020/0293878 | A1 * | 9/2020 | Bhaskar | G06F 16/35 |
| 2021/0182935 | A1 * | 6/2021 | Malkiel | G06F 16/3347 |
| 2021/0286989 | A1 * | 9/2021 | Zhong | G06F 40/177 |
| 2021/0326393 | A1 * | 10/2021 | Aggarwal | G06F 16/90348 |
| 2021/0357433 | A1 * | 11/2021 | Ganguly | G06N 20/00 |

(Continued)

OTHER PUBLICATIONS

Lavoie et al., An accurate estimation of the Levenshtein distance using metric trees and Manhattan distance, Published in: 2012 6th International Workshop on Software Clones (IWSC) Date of Conference: Jun. 4-4, 2012 (Year: 2012).*

(Continued)

*Primary Examiner* — Chesiree A Walton
(74) *Attorney, Agent, or Firm* — K&L Gates LLP (57) ABSTRACT

Systems and techniques are generally described for detecting evasive terms in item listings. In some examples, a first list of terms is determined. Terms of the first list of terms may be associated with evasive listing practices. In various examples, a first embedding representing a first term in an embedding space may be determined. In some examples, the top k closest embeddings in the embedding space to the first embedding may be determined. A term associated with one of the top k embeddings may be determined. A first Levenshtein distance between the first term and the second term may be determined. A list of items associated with the second term may be determined based on the Levenshtein distance being less than a threshold distance. An alert related to the list of items may be generated.

20 Claims, 6 Drawing Sheets

(56) References Cited

U.S. PATENT DOCUMENTS

2022/0292123 A1* 9/2022 Hoppe ................ G06F 16/319

OTHER PUBLICATIONS

B. Burr, S. Wang, G. Salmon and H. Soliman, "On the Detection of Persistent Attacks using Alert Graphs and Event Feature Embeddings," NOMS 2020—2020 IEEE/IFIP Network Operations and Management Symposium, 2020, pp. 1-4; Date of Conference: Apr. 20-24, 2020 ;Date Added to IEEE Xplore: Jun. 8, 2020 (Year: 2020).*

Kusner et al., From Word Embeddings To Document Distances, Proceedings of the 32nd International Conference on Machine Learning, pp. 957-966, PLMR, Jun. 2015 (Year: 2015).*

Greenstein-Messica, Asnat, and Lior Rokach. "Machine learning and operation research based method for promotion optimization of products with no price elasticity history." Electronic Commerce Research and Applications 40 Mar.-Apr. 2020, 100914 (Year: 2020).*

Palagin et al., Distributional semantic modeling: a revised technique to train term/word vector space models applying the ontology-related approach, Computation and Language (cs.CL); Artificial Intelligence (cs.AI) arXiv:2003.03350 , Mar. 6, 2020 (Year: 2020).*

* cited by examiner

DETECTION OF EVASIVE ITEM LISTINGS

BACKGROUND

Online transactional fraud attempts continue to grow year-over-year, putting pressure on retailers to innovate in order to protect customers and revenue. The field of online fraud detection can be categorized as an adversarial environment, where those with intentions to commit fraud are pitted against those endeavoring to prevent and deter such activity. This "arms race," as it is often referred to, involves continuous adaptation, as tactics of the opponents evolve over time. In a particularly egregious example of fraudulent activity, bad actors may seek to profit from tragedy and/or emergency situations by raising the prices of necessary goods during periods of increased demand following the tragedy/emergency. Such activity is typically referred to as "price gouging," and is widely considered highly unethical. For example, increasing the cost of hand sanitizer during a pandemic would be considered price gouging. Online retailers take steps to detect and remove listings and/or block third party sellers that engage in price gouging. However, due to the "arms race" described above, sellers evolve new techniques to evade heuristic-based filtering systems.

DETAILED DESCRIPTION

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Perpetrators of price gouging and transactional fraud in the online retail space continually attempt to modify their behavior and/or the characteristics of their fraudulent transactions in order to avoid detection by automated fraud filters and/or fraud detection machine learning models used to distinguish between potentially fraudulent transactions and non-fraudulent transactions. As a result, technologies are continuously developed by fraud prevention teams to attempt to detect and prevent fraud in an ever-evolving climate. Accordingly, the actions of bad actors and fraud prevention teams are adversarial in nature, as a change in fraud detection techniques results in evolving fraudster methodologies, and vice versa.

For example, keyword attributes related to high demand items may be searched to identify price gouging. For example, after a hurricane, items such as bottled water, canned food, housing materials, gasoline, etc., may be in high demand. Accordingly, heuristic filters may be used to determine item listings (e.g., on an e-commerce site) that include such keywords as "water," "lumber," "bottled," "canned," "food," "plywood," etc., in order to detect and prevent potential price gouging of such high demand items. However, bad actors may modify the titles of their items to avoid detection using evasive terminology. For example, bad actors may intentionally misspell and/or introduce characters into the titles of their listings to attempt to evade keyword filters. For example, instead of including the terms "bottled water" in the title of a listing, the bad actor may instead include the terms "botttled water" in the listing title. The listing with the intentionally misspelled word (e.g., the addition of an extra "t" in "botttled water") may still be returned in a user's search for "water," and may thus lead some users to pay the higher price—effectively allowing the seller to profit from the natural disaster (e.g., a hurricane) due to low supply and high demand. It is impossible to program heuristic filters to capture all intentionally evasive variations of keywords due to the innumerable different ways in which a bad actor can modify their listings.

Accordingly, described herein is a machine learning based approach for detecting intentionally evasive listing terminology. Instead of using heuristic-based approaches, the various techniques described herein determine individual n-dimensional word embeddings of a text corpus representing the entire catalog of listings of a marketplace of interest (e.g., all listings on an e-commerce service available in the United States, Europe, Texas, India, etc.). The word embeddings capture not only the particular spelling of the words, but semantic information related to the spelling, the semantic meaning, usage, syllabic similarity, etc. Further, the various techniques described herein may exhibit scale-independent expansion capability across multiple languages and/or marketplaces.

In the various techniques described herein, a list of "sensitive terms" are determined. Sensitive terms may include terms describing and/or otherwise related to products that are expected to be the subject of price gouging attempts and/or other fraud attempts. In other words, sensitive terms may be terms known to be associated with potentially fraudulent activity such as evasive listing practices. In various examples, the sensitive terms may be promulgated by a government agency and/or may be determined based on empirical data. For example, during the COVID-19 pandemic, the Center for Disease Control (CDC) has generated a list of keywords that may relate to products that may be the subject of price gouging. Each sensitive term may be input into a machine learning model that has been trained on a corpus of text data representing the terms used in titles of each item listing (e.g., each item of content listed) in a selected marketplace of an e-commerce service. The machine learning model may be trained to generate an n-dimensional word embedding representing an input word. Accordingly, a word embedding may be generated for each sensitive term.

Thereafter, for each sensitive term word embedding, the top-k closest embeddings in the n-dimensional embedding space may be determined. Since the n-dimensional embedding space includes embeddings for each term in the title of each listing of the selected marketplace, there are embeddings representing all terms in all listing titles—including intentionally misspelled and/or evasive terms used by bad actors. For each sensitive term, the top-k closest embeddings represent the terms that are closest to the input sensitive term in the embedding space.

In embodiments described herein, a Levenshtein distance between the input sensitive term and each of the terms associated with the top-k closest embeddings is determined. The Levenshtein distance represents the number of character (or blank space) substitutions, additions, and deletions between two strings. For example, the Levenshtein distance between "four" and "fore" is two. The Levenshtein distance between "brick" and "bright" is three. The Levenshtein distance between "w @t3r" and "water" is three. The Levenshtein distance between "bandages" and "bandag" is two, etc.

In order to reduce the search space for potentially evasive terms, a subset of the terms with a Levenshtein distance of less than some predetermined threshold number (e.g., less than three) is determined. This subset of terms may next be compared with a dictionary in the relevant language to determine if these words represent natural, spoken language terms in the relevant language. One way to compare the subset of terms to natural, spoken language words of the particular language is to compare the word embeddings for the words to the embedding space of a pre-trained language model (e.g., a pre-trained embedding model trained for the appropriate language). If the word embedding has a match, the corresponding term is a natural term known in the language. Conversely, if the word embedding does not have a match, the term may be an evasive term.

Next, the evasive terms may be used to search the e-commerce service to determine item listings and/or sellers associated with the evasive term. For example, if the term "facemask_" is determined to be evasive using the previously described techniques, "facemask_" may be used to query the e-commerce service to determine all item listings using this term. The item listings may be investigated to see if these item listing violate any pre-determined guardrails. Items that violate a pre-determined guardrail and which include an evasive term may be described as evasive product listings. For example, there may be a guardrail during a particular crisis (such as the COVID-19 pandemic) that a particular type of facemask (e.g., products of product type=facemask) should cost no more than $1 per mask. An item listing that includes the evasive term "facemask_" may violate the guardrail (e.g., by charging more than $1). A list of items (and/or accounts posting items) that include evasive terms and which violate one or more guardrails may be sent to an audit system (and/or to an auditor) for auditing and/or further remedial action. For example, the auditor may warn the account posting the listing, may remove the listing, may block the account, etc. In various examples, instead of sending the list of items and/or accounts to a human auditor, an automated approach may be used to block or remove the listing, warn the account holder, and/or take some other remedial action(s).

Determining embedding vectors of sensitive terms and comparing the embedding vectors to embedding vectors determined for the text corpus of all catalog items (e.g., in a selected marketplace and/or region), in a shared embedding space, provides a way to determine the most similar terms in the text corpus to the sensitive terms.

Machine learning techniques, such as those described herein, are often used to form predictions, solve problems, recognize objects in image data for classification, etc. For example, herein machine learning techniques may be used to determine substitute items for a given item. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks. For example, the word embedding models described herein may be retrained (e.g., daily, hourly, weekly, and/or at some other cadence) such that the word embedding models represent the most current item listing data (e.g., based on the most recent, updated catalog of items).

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings are typically of lower dimensions relative to the data that the embeddings represent. In various examples, token embeddings may be generated to represent various text (e.g., titles of item listings) described herein for input into the various machine learning models described herein.

Figure 1:
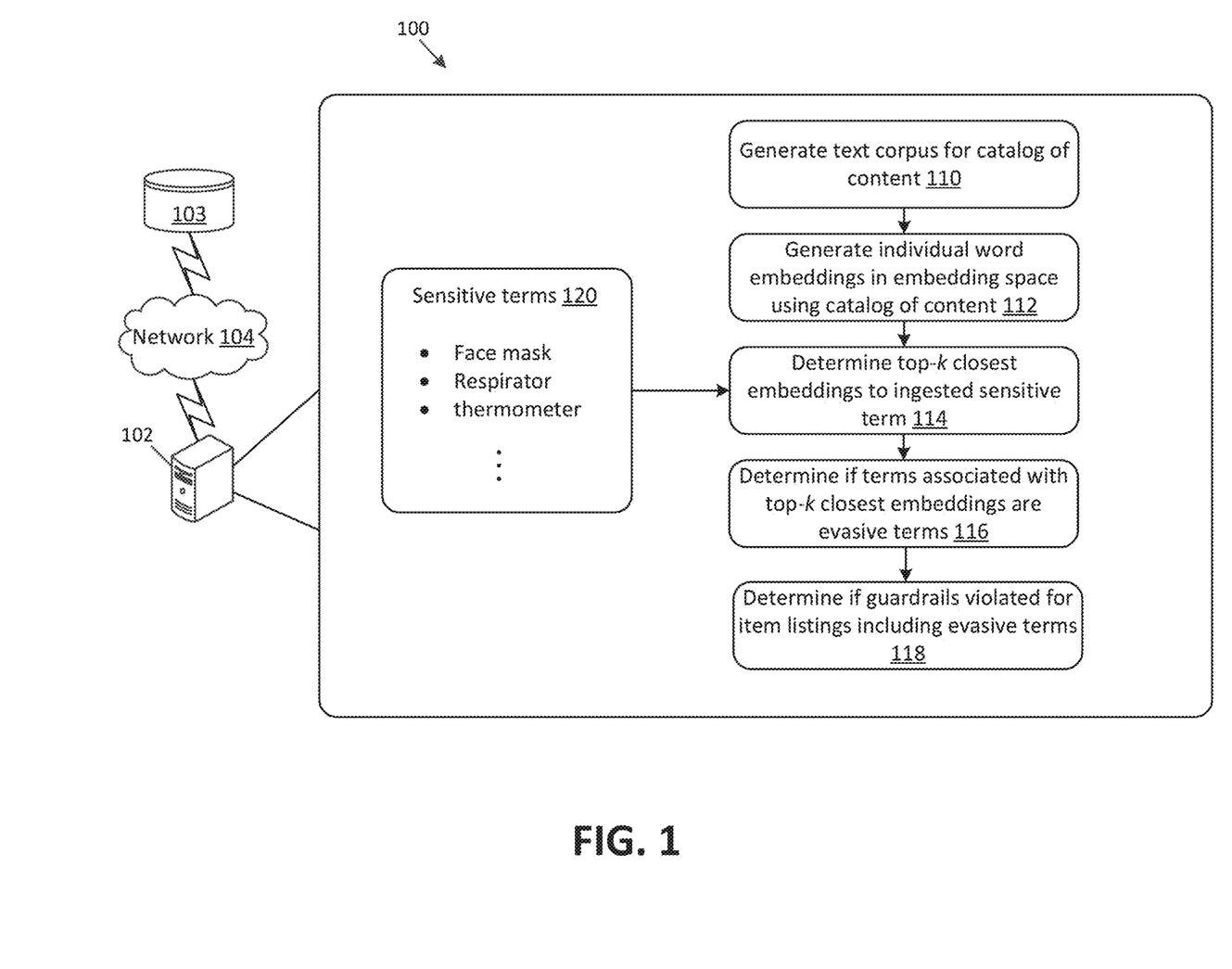
FIG. 1 is a block diagram depicting an example system effective to detect evasive listings, according to various embodiments of the present disclosure.

FIG. 1 is a block diagram depicting an example system 100 effective to detect evasive listings, according to various embodiments of the present disclosure. In various examples, one or more computing devices 102 may be used to implement the evasive listing detection system (e.g., system 100) and/or techniques described herein. Computing devices 102 may communicate with one another and/or with one or more of the other components depicted in FIG. 1 over a network 104 (e.g., a local area network (LAN) and/or a wide area network (WAN) such as the internet). For example, computing devices 102 may communicate with a non-transitory computer-readable memory 103 over network 104. In various examples, the non-transitory computer-readable memory 103 may store instructions that, when executed by at least one processor of the computing devices 102, may cause the computing devices to perform the various evasive listing detection actions described herein.

A list of sensitive terms 120 may be determined. In the example depicted in FIG. 1, the sensitive terms 120 include words related to or describing medical equipment, such as the terms "face mask," "respirator," "thermometer," etc. As used herein, "term" and "terms" refers to any string of characters. In many examples, "term" and "terms" refer to natural language words. However, in some examples used herein, "term" and "terms" refer to intentionally misspelled words and/or words with special characters inserted used by bad actors to attempt to evade fraud and/or price gouging filters. In various examples, sensitive terms 120 may include terms describing and/or otherwise related to products that are expected to be the subject of price gouging attempts and/or other fraud attempts. In various examples, the sensitive terms 120 may be promulgated by a government agency and/or may be determined based on empirical data (e.g., data related to past price gouging and/or fraud attempts). For example, during the COVID-19 pandemic, the Center for Disease Control (CDC) has generated a list of keywords that may relate to products that may be the subject of price gouging.

The system 100 may receive and/or generate a text corpus for a catalog of content (block 110). In various examples, the text corpus may be a data structure that includes structured data representing the title and/or description of every item listing in a particular regional marketplace. In various examples, the text corpus may be representative of a global marketplace. However, in some other examples, the text corpus may be confined to a particular region and/or market (e.g., a text corpus confined to a country, to North America, etc.). In various examples, it may be advantageous to limit the text corpus to a particular spoken language.

The text corpus may be used to train a machine learning model that generates individual word embeddings in an n-dimensional embedding space. The individual word embeddings represent words found in the text corpus (block 112). In various examples, the machine learning model may be a recurrent neural network (RNN) such as a long short term memory (LSTM) model and/or a gated recurrent unit (GRU) model effective to perform various natural language processing tasks. Accordingly, following block 112, individual word embeddings have been generated for each term in the provided text corpus—including potentially evasive terms found in current listings (such as "m@sk," "infared," "therometer," "face_mask1," etc.).

In various examples, the machine learning model may be a word-2-vec model trained to determine embeddings representing items in a corpus of items (e.g., items for sale via an e-commerce service). The word embeddings may capture the context of the word in a document, semantic and/or syntactic similarity, relations with other words, etc. Word-2-vec is one example approach that may be used to learn word embeddings using a relatively shallow neural network. However, other approaches may be used to learn and generate word embeddings in accordance with the various techniques described herein.

At block 114, the sensitive terms 120 are input into the machine learning model trained on the text corpus. Accordingly, individual word embeddings are generated for each of the sensitive terms 120. After generating the word embeddings for each of the sensitive terms 120, the top-k closest embeddings in the shared embedding space may be determined. k is a tunable parameter that may be selected based on empirical data to broaden or contract the search space. The top-k closest embeddings to a given sensitive term represents the terms that are most similar to the input sensitive term (among the terms in the text corpus for which the model has been trained).

For example, for the sensitive term "respirator", the top-k closest embeddings may represent the terms "resperator", "respiration", "rispirator", "_respirat0r", etc. At block 116, a determination may be made if terms associated with the top-k closest embeddings are evasive terms. Various techniques may be used to determine whether the terms are potentially evasive. Examples of such techniques are described in further detail below in reference to FIGS. 2-4.

Accordingly, terms that have been determined to be potentially evasive may be used to determine all the item listings that include such terms and/or all item listings that include such potentially evasive terms in the title of the listing (depending on the desired implementation). Accordingly, for each potentially evasive term, a list of item listings may be determined that include the potentially evasive term. For each of these item listings a determination may be made whether the item listing violates one or more guardrails (block 118). For example, in the price-gouging context, a determination may be made whether the item listing violates a threshold price (e.g., a price-gouging threshold) for goods of the particular type. For example, there may be a price maximum of $1 for a particular type of facemask used to prevent transmission of an infectious disease during a pandemic. If an item listing with a potentially evasive term in the title (or description) violates the guardrail by charging a higher price than the threshold price, the item listing may be flagged.

All flagged items listings violating guardrails may be aggregated in a batch and an alert may be generated. The alert may be related to the subset of product listings that include the potentially evasive terms and which violate one or more guardrails. The alert may indicate the type of fraud and/or price gouging that is present. In various examples, an automated action may be taken in response to the alert. For example, an email (or other message) may be automatically sent to the seller indicating that the item listing violates an applicable guardrail. The seller may be warned that the listing will be removed unless the seller adjusts the price per the applicable guardrail or otherwise conforms the listing to the appropriate guardrail. In some cases, if the seller has been previously warned, the item listing may be automatically removed and/or the seller's account may be flagged, suspended, and/or blocked. In various examples, the alert may be sent to a human auditor to evaluate the situation before taking remedial action.

Figure 2:
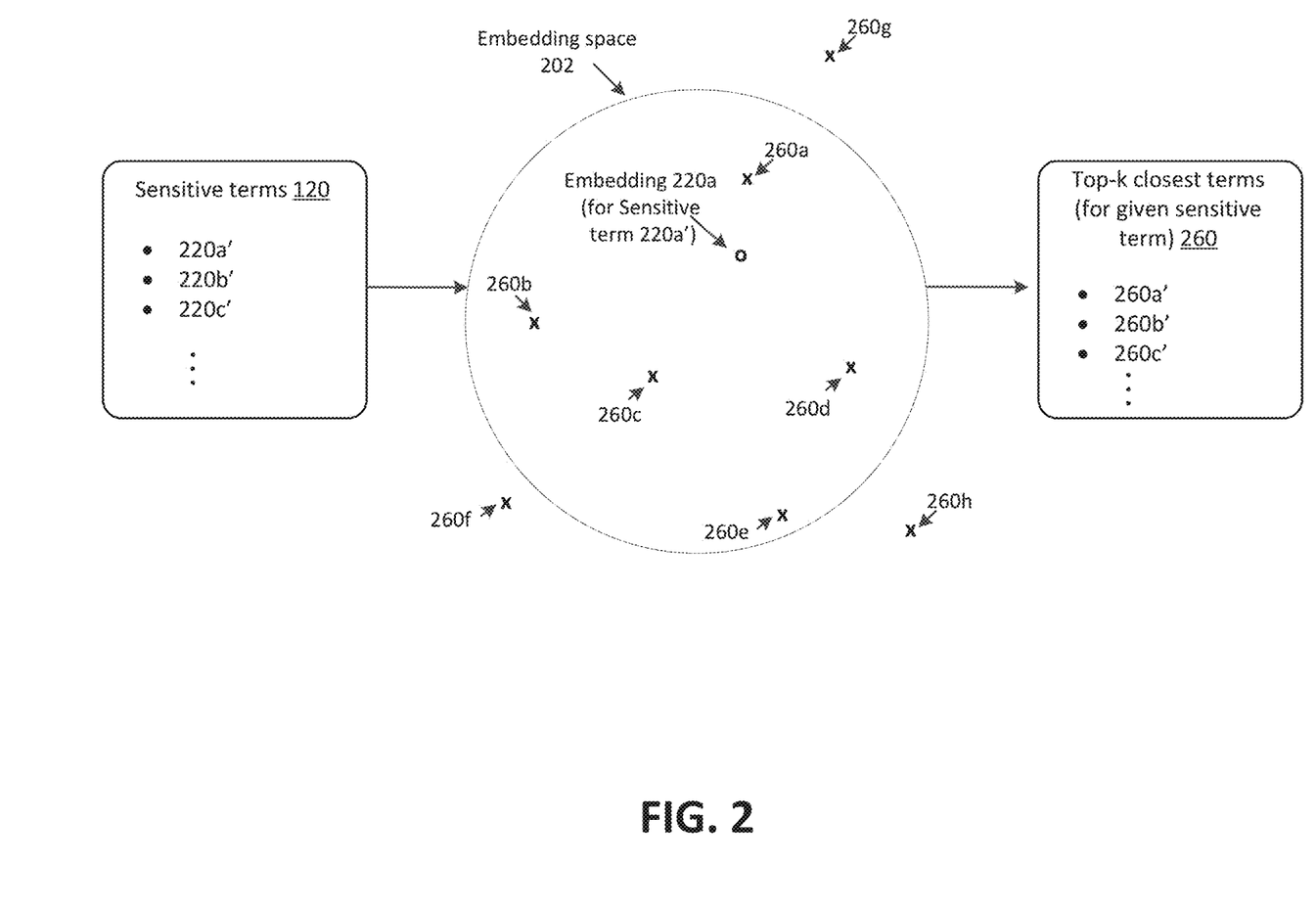
FIG. 2 depicts an example determination of the terms that are closest in an embedding space to a sensitive term, in accordance with various aspects of the present disclosure.

FIG. 2 depicts an example determination of the terms that are closest in an embedding space to a sensitive term, in accordance with various aspects of the present disclosure. Each of the sensitive terms 120 may be input into a machine learning model trained to generate individual word embeddings in embedding space 202 (an n-dimensional embedding space). The embedding space 202 includes word embeddings for each word of the catalog of item listings being evaluated for potentially evasive listings.

In the example shown in FIG. 2, embeddings 260a, 260b, 260c, 260d represent word embeddings of terms found in the catalog being evaluated. Sensitive terms 220a', 220b', 220c', etc., may be input into the machine learning model. Accordingly, word embeddings may be generated for each of the sensitive terms 120. In the example shown in FIG. 2, the embedding 220a has been generated for the sensitive term 220a'. The embedding 220a represents the sensitive term 220a' as a vector of numbers pertaining to the n-dimensional embedding space for which the particular embedding model (e.g., an RNN) has been trained, as previously described.

The top-k closest terms (for a given sensitive term) 260 may be determined. In the example shown in FIG. 2, k may be four, although it should be appreciated that k may any value (and typically may be a much larger value, such as 500, for example). Accordingly, in the illustrative example depicted in FIG. 2, the top-4 closest sensitive terms 260 (for the input sensitive term 220*a*') are 260*a*' (a term corresponding to embedding 260*a*), 260*b*' (a term corresponding to embedding 260*b*), 260*c*' (a term corresponding to embedding 260*c*), and 260*d*' (a term corresponding to embedding 260*d*). In the example, the "closest terms" are those terms with an embedding that is among the top 4 smallest distances (e.g., cosine distance, Euclidean distance, etc.) from the embedding 220*a* for sensitive term 220*a*' in the embedding space 202. In the example, the embeddings 260*e*, 260*f*, 260*g*, and 260*h* may be further away from the embedding 220*a* for sensitive term 220*a*' relative to embeddings 260*a*, 260*b*, 260*c*, and 260*d*. Accordingly, the terms associated with the embeddings 260*e*, 260*f*, 260*g*, 260*h* may not be among the top-k closest terms for the sensitive term 220*a*, when k=4.

Figure 3:
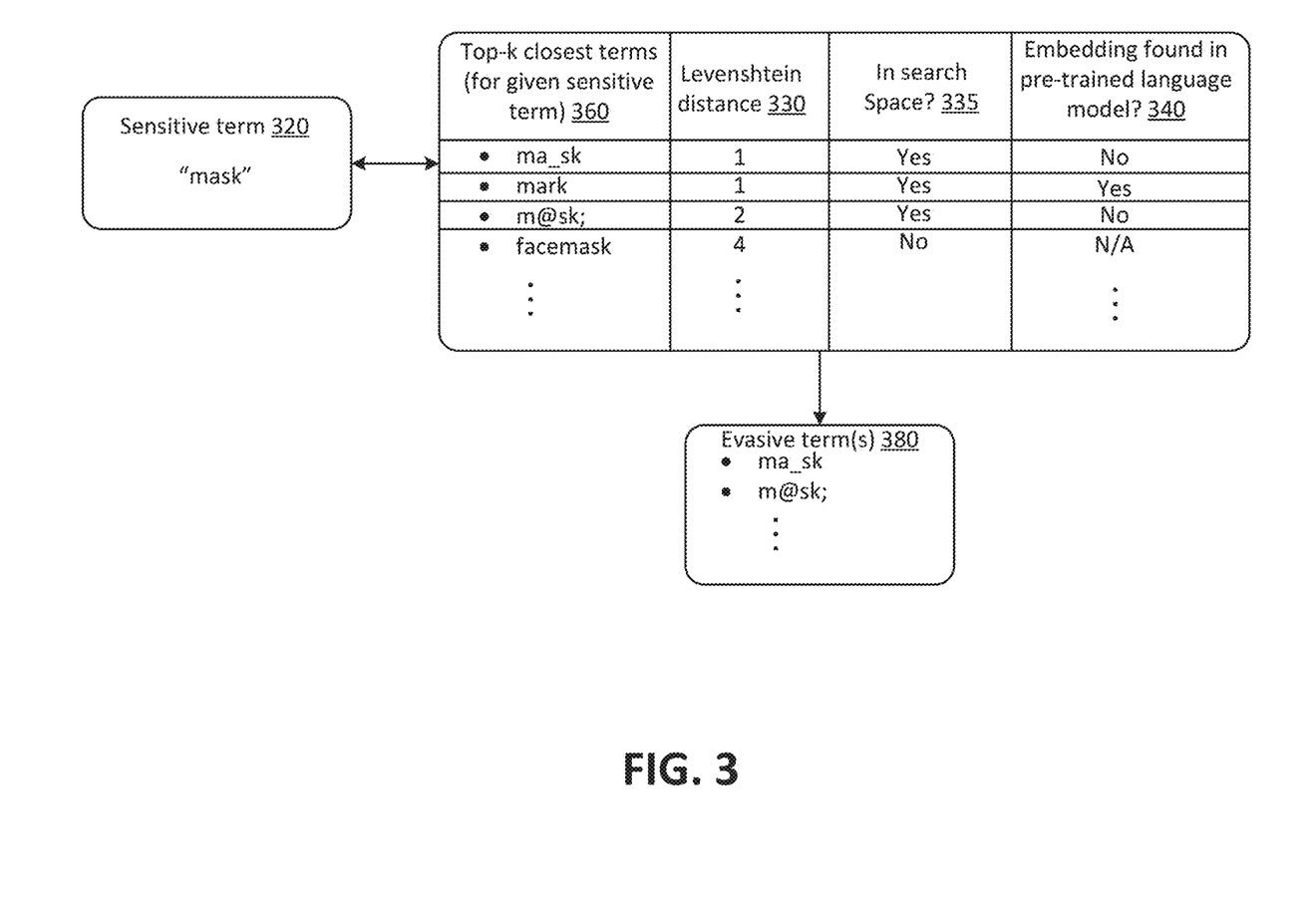
FIG. 3 depicts an illustration of an example process to determine whether terms in a list of potentially evasive terms are evasive, in accordance with various aspects of the present disclosure.

FIG. 3 depicts an illustration of an example process to determine whether terms in a list of potentially evasive terms are evasive, in accordance with various aspects of the present disclosure. In the example depicted in FIG. 3, the sensitive term 320 "mask" is being evaluated.

The top-k closest terms (for the given sensitive term "mask") 360 are determined. In the example shown in FIG. 3, the top-k closest terms include "ma_sk", "mark", "m@sk;", "facemask", etc. a Levenshtein distance 330 may be determined for each of the top-k closest terms 360.

In embodiments described herein, a Levenshtein distance between the input sensitive term 320 and the top-k closest terms 360 is determined. The Levenshtein distance represents the number of character (or blank space) substitutions, additions, and deletions between two strings. For example, the Levenshtein distance between "four" and "fore" is two. The Levenshtein distance between "brick" and "bright" is three. The Levenshtein distance between "w @t3r" and "water" is three. The Levenshtein distance between "bandages" and "bandag" is two, etc. Although Levenshtein distance is described in many of the examples herein, other word similarity distance techniques (sometimes referred to as "word mover distances") may instead be used. For example, Hamming distance, q-gram distance, cosine distance, Jaccard distance, and/or Jaro distance may instead be used in accordance with the techniques described herein.

Accordingly, the Levenshtein distance 330 between "ma_sk" and "mask" is one. The Levenshtein distance between "mark" and "mask" is one; the leveshtein distance between "m@sk;" and "mask" is two (due to the @ symbol and the semi-colon); and the Levenshtein distance between "facemask" and "mask" is four. In various examples, in order to reduce the search space for potentially evasive terms, a subset of the top-k closest terms 360 may be determined as those terms with a Levenshtein distance (or other word similarity distance) from the subject term (e.g., "mask") of less than a threshold value. Accordingly, a determination of whether each of the top-k closest terms 360 is within the search space (column 335) may be determined by comparing the Levenshtein distance to the threshold distance. If the Levenshtein distance for a term is less than the threshold distance, the term may be in the search space in column 335. Conversely, if the Levenshtein distance is greater than the threshold distance, the term may not be within the search space and the term may not be considered an evasive term 380.

In an example, the threshold may be three. Accordingly, in one example implementation, the top-k closest terms 360 with a Levenshtein distance that is ≤3 (with respect to the subject sensitive term 320) may be determined as being potentially evasive and may be subjected to further investigation, as described herein. The Levenshtein distance threshold of ≤3 is merely an example. Other thresholds (e.g., <3, ≤2, ≤4, etc.) may be used in accordance with the desired implementation. Accordingly, in the example using a Levenshtein distance threshold of ≤3, the subset of potentially evasive terms may be determined to include the terms "ma_sk", "mark", and "m@sk" as each of these terms has a leveshtein distance of ≤3 (and are thus denoted as being within the search space in column 335). Conversely, the term "facemask" has a Levenshtein distance of four and may thus be excluded from further examination, in some embodiments. Accordingly, facemask is determined to not be within the search space in column 335.

Among the subset of potentially evasive terms (e.g., "ma_sk", "mark", and "m@sk"), the search space may be further narrowed in some embodiments, by determining whether the embedding representing the terms in the subset are recognized term in a natural language. There are various ways of making a determination of whether a particular term is a recognized term in a natural language. For example, a dictionary of terms for a language (e.g., French, Spanish, English, etc.) may be loaded into memory and a lookup may be performed to determine if a given term is present in the dictionary. In one example embodiment, the embedding for a particular potentially evasive term (previously determined as described above in reference to FIG. 2) may be compared to embeddings of a pre-trained language model (block 340). Pre-trained language models used for machine translation, text summarization, topic modeling, and/or various other tasks are widely available in a variety of different spoken languages. Accordingly, simply comparing the embedding of a potentially evasive term to known embeddings of a pre-trained natural language model may be an efficient way to determine whether a particular term is part of a particular natural language.

In the example depicted in FIG. 3, the embedding for the term "ma_sk" may not match any embedding in a pre-trained language model (e.g., for the English language). Accordingly, a determination may be made that the term "ma_sk" is not part of the English language. Conversely, the embedding for the term "mark" may match an embedding in the pre-trained language model. As such, the term "mark" may be determined to be a term in the English language. A determination may be made that the term "m@sk" is not part of the English language in a similar manner. No determination may be made for the term "facemask" since the Levenshtein distance for "facemask" exceeded the threshold of three, and thus was not among the subset of potentially evasive terms for the sensitive term 320—"mask".

The terms that are determined to not be part of the subject language (e.g., English, in the current example), may be determined to be evasive term(s) 380. In the current example, the evasive terms 380 include "ma_sk" and "m@sk". These terms have been determined to be evasive as the terms are among the top-k closest terms to the subject term "mask", have a Levenshtein distance of the less than the threshold leveshtein distance (e.g., 3) from the subject term, and are not terms that are associated with natural language terms in the relevant language.

As described in further detail below, once the list of evasive term(s) 380 is determined, the terms may be used to look up all item listings that include one or more of the evasive term(s) 380. Thereafter, the item listings may be investigated to determine whether one or more guardrails are being violated. If so, appropriate action(s) may be taken, such as forwarding the list of item listings to an investigator, generating an alert regarding potential price gouging and/or fraudulent activity and sending it to an auditor, removing the listing, blocking the seller, etc.

Figure 4:
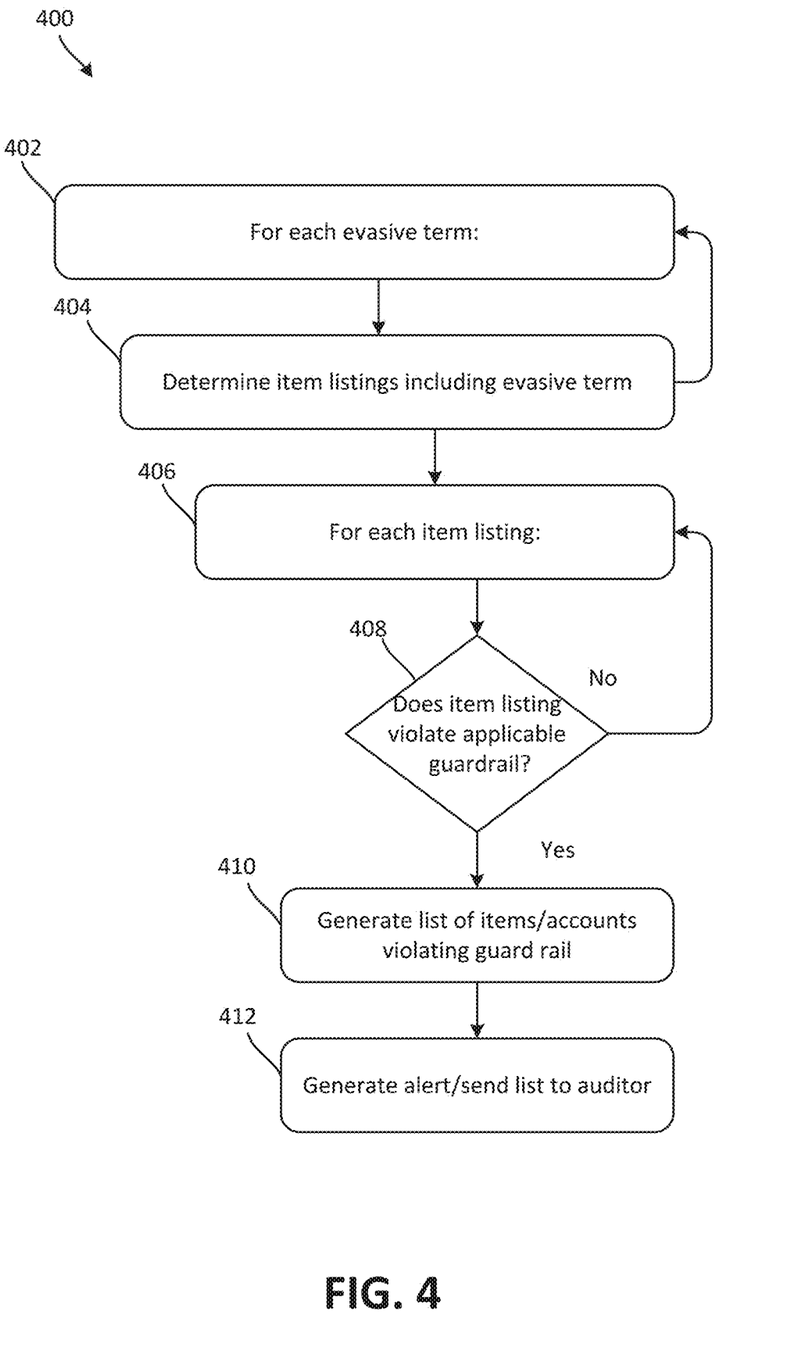
FIG. 4 depicts an example determination of items and/or listings that include an evasive term, in accordance with various aspects of the present disclosure.

FIG. 4 depicts an example process for determining items and/or listings that include an evasive term, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 402, at which a "for loop" is established to perform the action 404 for each evasive term (e.g., for each of evasive term(s) 380 determined using the various techniques described above in reference to FIGS. 1-3). At action 404, a determination may be made, for a given evasive term, of item listings that include the evasive term. In various examples, the particular evasive term may be used to query a particular marketplace of an e-commerce service (e.g., using various search techniques, such as a keyword search) to determine items that include the evasive terms. In some examples, the query using the evasive term may be limited to the title of item listings, while in other examples, the query may also search for the evasive term in the listing's item description. As previously described, the search may be performed for each evasive term to determine a set item listings that include a particular evasive term.

Processing may proceed to action 406, at which a "for loop" is established to determine, for each of the item listings identified at action 404, whether the item listing violates applicable guardrails (action 408). At action 408, guardrail data may be determined. The guardrail data may specify various prohibitions and/or specifications to which item listings and/or sellers are required to conform. For example, for certain items, there may be a guardrail that prohibits a seller from charging more than a particular price. In various examples, the guardrails may be established during crises to prevent price gouging of necessary goods and/or services.

Processing may proceed to action 410, at which a list of items and/or accounts (e.g., seller accounts) may be generated that violate at least one guardrail. In various examples, the list may be per-evasive term, while in other examples, the list may be aggregated such that any item listing containing at least one evasive term may be included only once in the list.

Processing may continue to action 412, at which an alert may be generated and/or the list from action 410 may be sent to an auditor and/or other monitoring system. The alert may indicate the implicated item listing, the particular guardrail violated, and/or the evasive term(s) used in the item listing. In some examples, the alert may recommend a specific action. For example, the alert may recommend warning an account associated with the listing and/or suspending an account associated with the listing (e.g., due to repeated rule violations).

Figure 5:
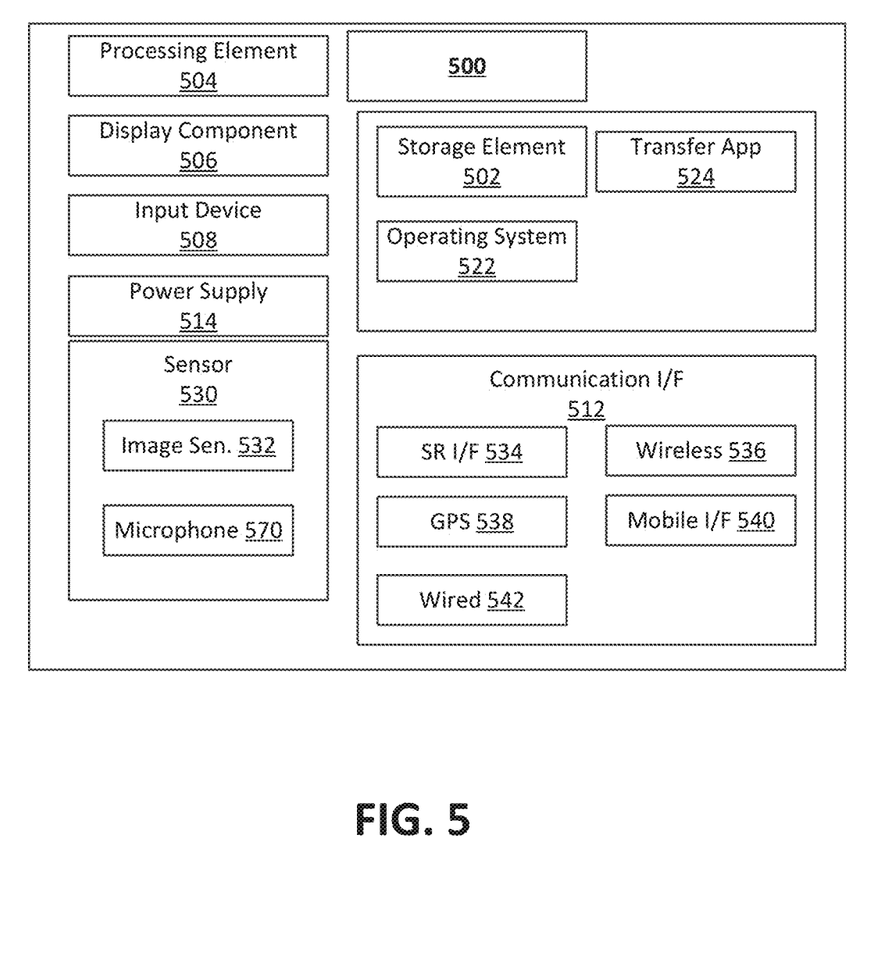
FIG. 5 is a block diagram showing an example architecture of a computing device that may be used in accordance with various aspects of the present disclosure.

FIG. 5 is a block diagram showing an example architecture 500 of a computing device that may be used to detect evasive terms in item listings, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models used for the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
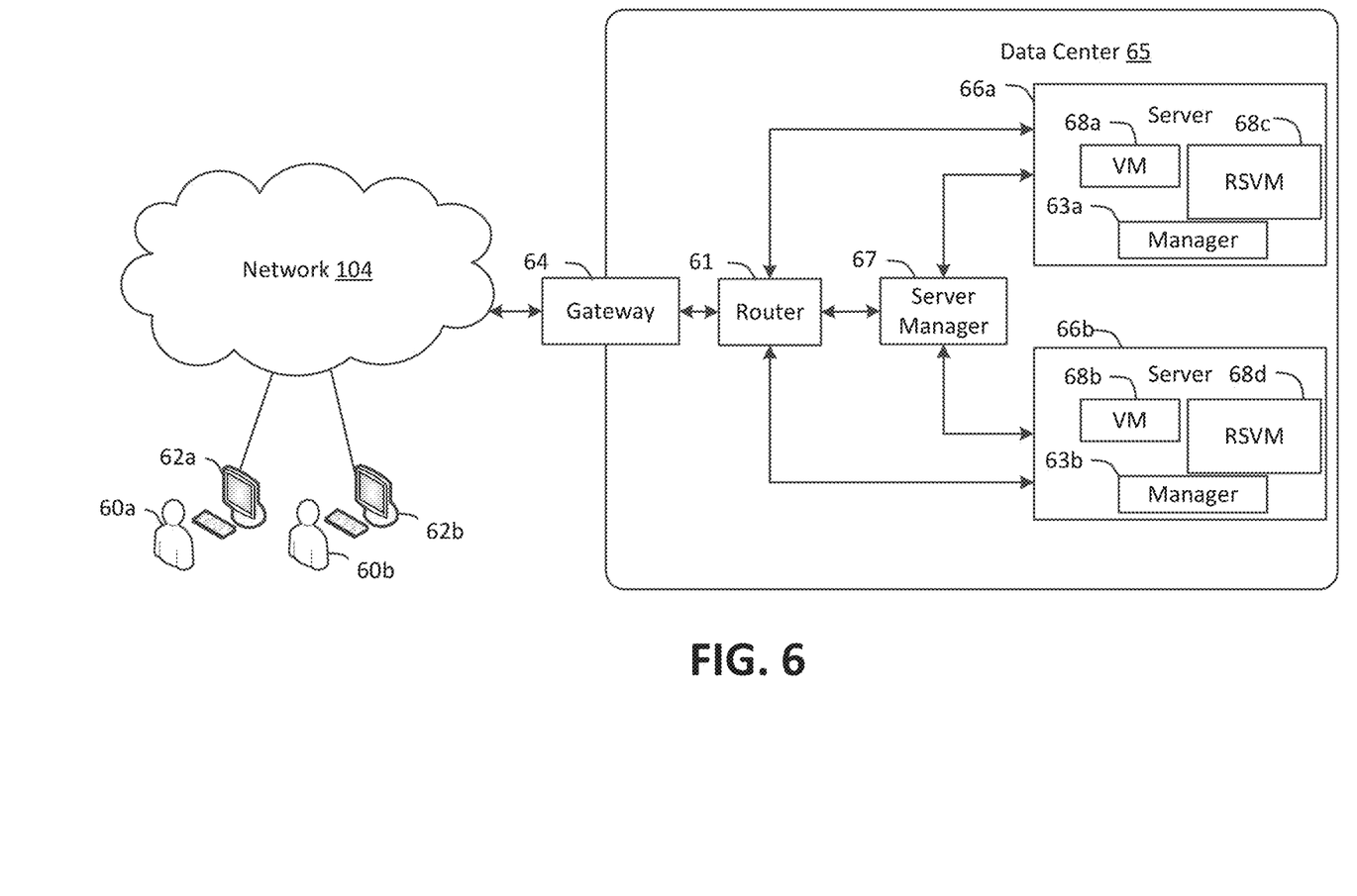
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various techniques for detection of evasive terms described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method to detect evasive text, comprising:
   receiving a list of sensitive terms associated with evasive terminology;
   determining, by a first machine learning model executed by a first computing device, for a first term of the list of sensitive terms, a first embedding representing the first term in an embedding space;
   determining, by the first machine learning model, a loss representing a difference between a predicted text output of the first machine learning model and an expected text output of the first machine learning model;
   updating parameters of the first machine learning model using back propagation based at least in part on the loss;
   determining a top k closest embeddings in the embedding space to the first embedding;
   determining, for a second embedding of the top k closest embeddings, a second term represented by the second embedding, wherein the second term represents a misspelled version of the first term of the list of sensitive terms;
   determining a Levenshtein distance between the first term and the second term;
   determining that the Levenshtein distance is less than a threshold Levenshtein distance;
   determining a set of one or more text listings with a description that includes the second term;
   determining if the one or more text listings include data that violates an applicable guardrail; and
   generating an alert for text listings that have data violating the applicable guardrail, wherein the alert indicates that an evasive term has been used in the text listings and provides an indication of a potential violation of the applicable guardrail.

2. The computer-implemented method of claim 1, further comprising determining that the second embedding is not found among a pre-trained embedding model, trained for a first spoken language.

3. The computer-implemented method of claim 1, further comprising:
   receiving a catalog of items associated with a regional marketplace comprising at least one country; and
   generating, for the catalog of items by the first machine learning model, word embeddings for each item in the catalog of items, wherein the embedding space comprises the word embeddings, and wherein the first embedding and the top k closest embeddings are included in the word embeddings.

4. A method comprising:
   determining, by a first machine learning model, a first output using first text data;
   determining a first loss comprising a different between the first output and an expected output
   updating parameters of the first machine learning model based at least in part on the first loss using back propagation;
   determining first data comprising a first list of terms, wherein the first list of terms comprises sensitive terms associated with evasive terminology;

determining, by the first machine learning model for a first term of the first list of terms, a first embedding representing the first term in an embedding space;

determining a top k closest embeddings in the embedding space to the first embedding;

determining for a second embedding of the top k closest embeddings, a second term represented by the second embedding, wherein the second term represents a misspelled version of the first term;

determining a first word similarity distance between the first term and the second term;

determining, based at least in part on the first word similarity distance, a list of documents including the second term; and generating an alert related to one or more documents of the list of documents the alert indicating potential use of evasive terminology in the one or more documents.

5. The method of claim 4, further comprising determining that the second embedding is not found among a pre-trained embedding model, trained for a first spoken language.

6. The method of claim 4, further comprising determining the first list of terms based at least in part on determining terms related to price gouging in a first regional marketplace.

7. The method of claim 4, further comprising:
determining that the first word similarity distance is less than or equal to three; and
determining whether or not the second term is a natural term in a first spoken language by searching a pre-trained embedding model using the second embedding, wherein the pre-trained embedding model is trained to generate word embeddings for the first spoken language.

8. The method of claim 4, further comprising:
determining, for a first document of the list of documents including the second term, a price associated with the first document;
determining that the price exceeds a threshold price for a product type associated with the first document; and
generating the alert to include data indicating that the first document is associated with_price gouging and includes the evasive terminology.

9. The method of claim 4, further comprising sending the alert to an audit system for auditing of the list of documents.

10. The method of claim 4, further comprising:
receiving a first catalog of items associated with a regional marketplace; and
generating, for the first catalog of items, word embeddings for each item in the first catalog of items using the first machine learning model, wherein the embedding space comprises the word embeddings, and wherein the first embedding and the top k closest embeddings are included in the word embeddings.

11. The method of claim 10, further comprising:
receiving a second catalog of items representing an updated catalog of items relative to the first catalog of items; and
generating for the second catalog of items a second machine learning model comprising word embeddings for each item in the second catalog of items.

12. The method of claim 4, further comprising:
generating a text corpus representing a first catalog of items; and
training the first machine learning model to generate word embeddings in the embedding space using the text corpus.

13. A system comprising:
at least one processor; and
at least one non-transitory computer-readable memory storing instructions that, when executed by the at least one processor, are effective to cause the at least one processor to:
determine, by a first machine learning model, a first output using first text data:
determine a first loss comprising a different between the first output and an expected output;
update parameters of the first machine learning model based at least in part on the first loss using back propagation;
determine first data comprising a first list of terms, wherein the first list of terms comprises sensitive terms associated with evasive terminology;
determine, by the first machine learning model for a first term of the first list of terms, a first embedding representing the first term in an embedding space;
determine a top k closest embeddings in the embedding space to the first embedding;
determine for a second embedding of the top k closest embeddings, a second term represented by the second embedding, wherein the second term represents a misspelled version of the first term;
determine a first word similarity distance between the first term and the second term;
determine, based at least in part on the first word similarity distance, a list of documents including the second term; and
generate an alert related to one or more documents of the list of documents the alert indicating potential use of evasive terminology in the one or more documents.

14. The system of claim 13, wherein the at least one non-transitory computer-readable memory stores further instructions that, when executed by the at least one processor, are further effective to cause the at least one processor to determine that the second embedding is not found among a pre-trained embedding model, trained for a first spoken language.

15. The system of claim 13, wherein the at least one non-transitory computer-readable memory stores further instructions that, when executed by the at least one processor, are further effective to cause the at least one processor to determine the first list of terms based at least in part on determining terms related to price gouging in a first regional marketplace.

16. The system of claim 13, wherein the at least one non-transitory computer-readable memory stores further instructions that, when executed by the at least one processor, are further effective to cause the at least one processor to:
determine that the first word similarity distance is less than or equal to three; and
determine whether or not the second term is a natural term in a first spoken language by searching a pre-trained embedding model using the second embedding, wherein the pre-trained embedding model is trained to generate word embeddings for the first spoken language.

17. The system of claim 13, wherein the at least one non-transitory computer-readable memory stores further instructions that, when executed by the at least one processor, are further effective to cause the at least one processor to:
determine, for a first document of the list of documents including the second term, a price associated with the first document;

determine that the price exceeds a threshold price for a product type associated with the first document; and generate the alert to include data indicating that the first document is associated with_price gouging and includes the evasive terminology.

18. The system of claim 13, wherein the at least one non-transitory computer-readable memory stores further instructions that, when executed by the at least one processor, are further effective to cause the at least one processor to send the alert to an audit system for auditing of the list of documents.

19. The system of claim 13, wherein the at least one non-transitory computer-readable memory stores further instructions that, when executed by the at least one processor, are further effective to cause the at least one processor to:

receive a first catalog of items associated with a regional marketplace; and generate, for the first catalog of items, word embeddings for each item in the first catalog of items using the first machine learning model, wherein the embedding space comprises the word embeddings, and wherein the first embedding and the top k closest embeddings are included in the word embeddings.

20. The system of claim 19, wherein the at least one non-transitory computer-readable memory stores further instructions that, when executed by the at least one processor, are further effective to cause the at least one processor to:

receive a second catalog of items representing an updated catalog of items relative to the first catalog of items; and generate for the second catalog of items a second machine learning model comprising word embeddings for each item in the second catalog of items.

* * * * *